US008629991B2

(12) United States Patent
Zaima

(10) Patent No.: US 8,629,991 B2
(45) Date of Patent: Jan. 14, 2014

(54) INFORMATION PROCESSING APPARATUS FOR PRINTING A FIRST IMAGE ADDED WITH A SECOND IMAGE RELATED TO THE FIRST IMAGE, METHOD OF CONTROLLING SAME, IMAGE FORMING APPARATUS AND COMPUTER PROGRAM

(75) Inventor: Nobuhiko Zaima, Abiko (JP)

(73) Assignee: Canon Kabushiki Kaisha (JP)

( * ) Notice: Subject to any disclaimer, the term of this patent is extended or adjusted under 35 U.S.C. 154(b) by 1246 days.

(21) Appl. No.: 11/953,450

(22) Filed: Dec. 10, 2007

(65) Prior Publication Data
US 2008/0144093 A1 Jun. 19, 2008

(30) Foreign Application Priority Data

Dec. 14, 2006 (JP) ................................. 2006-337577

(51) Int. Cl.
*G06F 3/12* (2006.01)
(52) U.S. Cl.
USPC ........ 358/1.13; 358/1.15; 358/1.16; 358/1.17
(58) Field of Classification Search
USPC ............ 358/1.13, 1.15, 527, 1.16, 1.17, 1.18, 358/1.12, 434–439
See application file for complete search history.

(56) References Cited

U.S. PATENT DOCUMENTS

| | | | | |
|---|---|---|---|---|
| 5,576,528 A * | 11/1996 | Chew et al. | ................... | 235/469 |
| 6,369,905 B1 * | 4/2002 | Mitsuhashi et al. | ......... | 358/1.15 |
| 6,384,925 B1 * | 5/2002 | Fujiyoshi | ..................... | 358/1.15 |
| 6,631,495 B2 * | 10/2003 | Kato et al. | ..................... | 715/255 |
| 7,265,855 B2 * | 9/2007 | Patton | .......................... | 358/1.15 |
| 2001/0044868 A1 * | 11/2001 | Roztocil et al. | ............... | 710/129 |
| 2004/0150855 A1 | 8/2004 | Tonegawa | | |
| 2006/0238799 A1 * | 10/2006 | Kidokoro | ..................... | 358/1.15 |
| 2007/0019222 A1 * | 1/2007 | Oda et al. | ..................... | 358/1.13 |
| 2007/0058214 A1 * | 3/2007 | Honma | ......................... | 358/474 |
| 2007/0058226 A1 * | 3/2007 | Lu et al. | ......................... | 358/527 |
| 2007/0199992 A1 * | 8/2007 | Manheim | ................. | 235/462.01 |

FOREIGN PATENT DOCUMENTS

JP 11175648 A 7/1999

OTHER PUBLICATIONS

Office Action cited in Japanese patent application No. 2006-337577, issued on Oct. 24, 2011.

* cited by examiner

*Primary Examiner* — Allen H Nguyen
(74) *Attorney, Agent, or Firm* — Rossi, Kimms & McDowell LLP

(57) ABSTRACT

An information processing apparatus outputs image data of a second image in such a manner that the second image is printed on a print medium by an image forming apparatus upon appending the second image to supplement a first image that is a print target, the second image being information related to the first image. The apparatus includes a determination unit which determines the formation position of the second image based upon content of an output setting and a rule; and a control unit which controls the image forming apparatus in accordance with the determined formation position in such a manner that the first and second images are formed on the same or different sheets of a print medium.

17 Claims, 12 Drawing Sheets

POSITION ON PAGE
⦿ LOWER RIGHT ○ UPPER RIGHT ○ ‥  ORDER OF PRIORITY  [4]

IN CASE OF PLURAL-PAGE SETTING
○ FIRST PAGE  ○ LAST PAGE  ⦿ EVERY PAGE  [2]

IN CASE OF BINDING SETTING
○ FIRST PAGE  ⦿ LAST PAGE  ○ EVERY PAGE  [1]

IN CASE OF BINDING SETTING 2
⦿ MOVE AWAY FROM BINDING POSITION
   BY MORE THAN SPECIFIED DISTANCE      SPECIFIED [2.0cm]  [3]
○ CORNER DIAGONALLY OPPOSITE BINDING POSITION   DISTANCE

IN CASE OF DOUBLED-SIDED SETTING
○ FRONT SIDE OF PAGE  ○ BACK SIDE OF PAGE  ⦿ UNSPECIFIED  [5]

F I G. 11
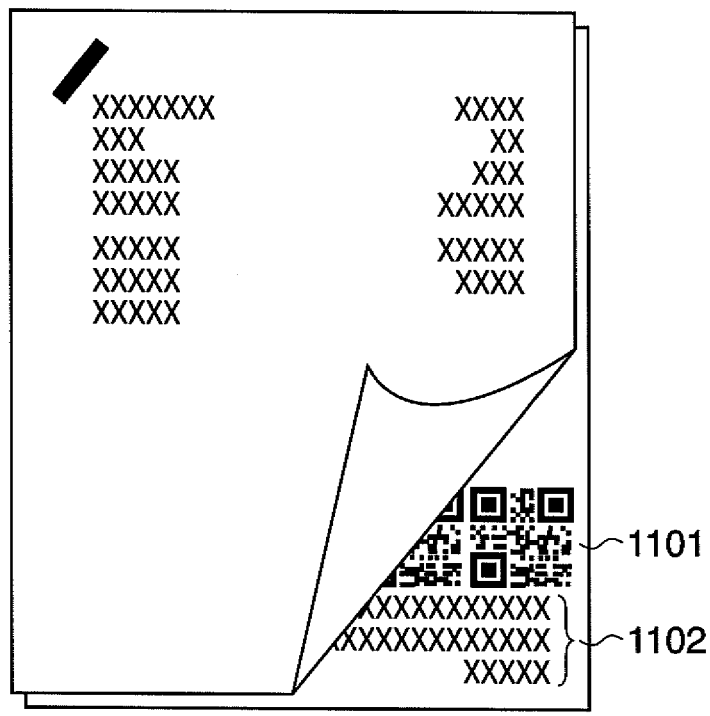

INFORMATION PROCESSING APPARATUS FOR PRINTING A FIRST IMAGE ADDED WITH A SECOND IMAGE RELATED TO THE FIRST IMAGE, METHOD OF CONTROLLING SAME, IMAGE FORMING APPARATUS AND COMPUTER PROGRAM

BACKGROUND OF THE INVENTION

1. Field of the Invention

The present invention relates to an information processing apparatus, method of controlling same, image forming apparatus and computer program for forming a first image, which is a main print target, and a second image utilized in order to acquire the original data of the first image.

2. Description of the Related Art

Documents used in an office often are created by application software that has been installed in a computer. Documents that have been handed out often are copied subsequently. However, such later-generation documents produced by copying come to have an image quality inferior to that of the first-generation documents that were the original documents. If a document that has been circulated in this manner is scanned by a scanner, the scanned-in document becomes image data that is capable of being utilized in a computer again. However, since this image data will be different from the original data that was created by the application software, it will be difficult to revise some of the content.

US 2004/0150855 proposes a method of appending to a handout document with a QR code, which is a two-dimensional bar code relating to the storage destination of the original data, and scanning the QR code by a scanner to acquire the original data. Since the invention of US 2004/0150855 is capable of acquiring the original data and of printing it again, a decline in image quality can be suppressed. Further, since the data is the original data, an additional advantage is that it is comparatively easy to handle and revise the data.

However, there is room for improvement with regard to the position at which the QR code is appended on a handout document. For example, if the QR code is added in a manner overlapping an image that is the main target of printing, there is the risk that the QR code will become unrecognizable. Further, if many pages are bound together, it will be difficult for a scanner to read a QR code if the position at which the QR code is appended is close to the binding position.

SUMMARY OF THE INVENTION

Accordingly, the present invention seeks to arrange it that the reading of a second image, which is utilized in order to acquire the original data of a first image that is the target of printing, will not be impeded.

The present invention is capable of being implemented also as an information processing apparatus. Specifically, there is provided an information processing apparatus for outputting image data of a second image in such a manner that the second image is printed on a print medium by an image forming apparatus upon appending the second image to supplement a first image that is a print target, the second image being information for acquiring the first image, the apparatus comprising: an input unit which inputs an image forming mode for the first image as an output setting; a storage unit which stores at least one rule for determining a formation position of the second image; a determination unit which determines the formation position of the second image based upon content of the output setting that has been input by the input unit and the rule that has been stored in the storage unit; and a control unit which controls the image forming apparatus in accordance with the determined formation position in such a manner that the first and second images are formed on the same or different sheets of a print medium.

The present invention is also capable of being implemented as an image forming apparatus that includes, in addition to the input unit, analyzing unit and determination unit, an image forming unit for forming the first and second images on the same or different sheets of a print medium in accordance with an image formation position that has been determined.

Further features of the present invention will become apparent from the following description of exemplary embodiments with reference to the attached drawings.

BRIEF DESCRIPTION OF THE DRAWINGS

FIG. 4 illustrates an example of a setting screen for setting rules;

FIG. 11 is a diagram illustrating an example of a handout document that has been created.

DESCRIPTION OF THE EMBODIMENTS

Embodiments of the present invention will be illustrated below. The individual embodiments described below will be useful in order to understand various concepts of the present invention, such as broader, intermediate and narrower concepts thereof. Further, the technical scope of the present invention is determined by the scope of the claims and is not limited by the individual embodiments set forth below.

First Embodiment

Figure 1:
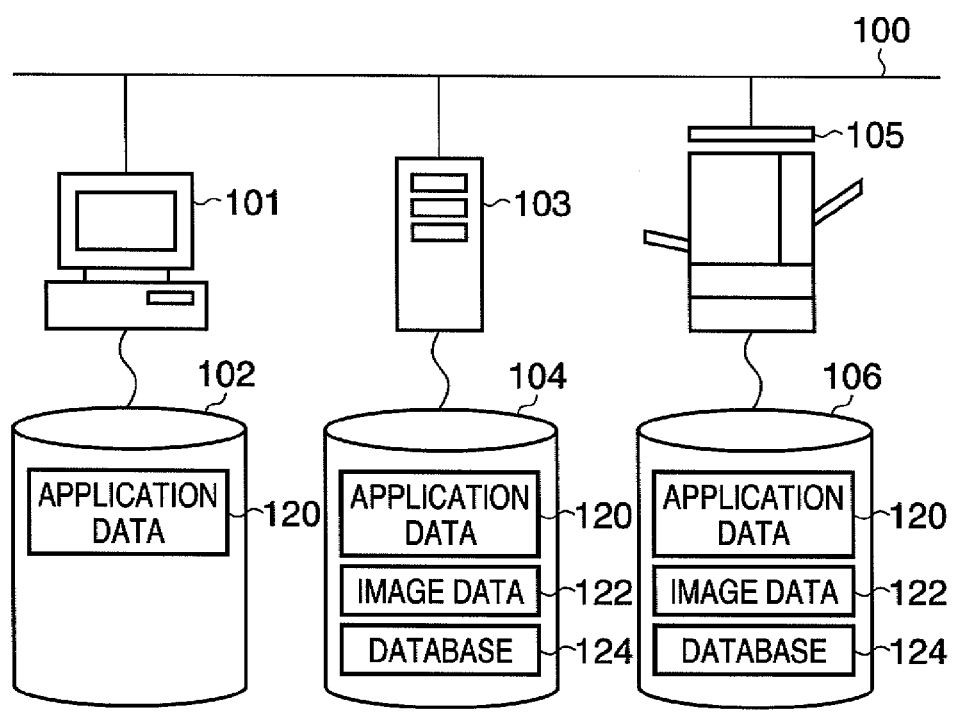
FIG. 1 is a diagram illustrating an example of a network system.

FIG. 1 is a diagram illustrating an example of a network system according to an embodiment. The present invention may be implemented not only by a personal computer but also by an image forming apparatus such as a printer, copier or multifunction peripheral.

A personal computer 101, document management server 103 and multifunction peripheral 105 are interconnected by a LAN 100. The LAN 100 may be a WAN, MAN, wireless LAN or the Internet.

The personal computer 101 is one example of an information processing apparatus. Application software (also referred to as merely "an application" below) such as word processor software, spreadsheet software and e-mail software run on the personal computer 101. Driver software (e.g., a printer driver and scanner driver) for using a printer and scanner possessed by the multifunction peripheral 105 also runs on the personal computer 101, as a matter of course. The personal computer 101 has a large-capacity disk 102. The large-capacity disk 102 stores an operating system, a printer driver, an application program and application data 120 created by the application. An example of an application program is a handout-document creating program for creating handout documents.

The document management server 103 is a server apparatus for associating and managing the application data 120 stored on a large-capacity disk 104 and image data 122 that has been created from the application data 120. A document management database 124 is a database for associating and managing the application data 120, image data 122 and index data, described later. The image data 122 is data in page units based upon a prescribed image format created from the application data 120. Examples of formats are TIFF, PDF or PDL such as PostScript (registered trademark). The document management server 103 may be incorporated in the multifunction peripheral 105.

The multifunction peripheral 105 is an image forming apparatus having a copy function, facsimile (FAX) function and network printer function. The multifunction peripheral 105 is one example of an information processing apparatus as well. A large-capacity disk 106 stores the document management database 124 in addition to the application data 120 and image data 122 received from the personal computer 101. It should be noted that when the multifunction peripheral 105 does not operate as the document management server 103, these items of data need not necessarily be stored on the large-capacity disk 106. The multifunction peripheral 105 also has a transmitting function for transmitting image data, which has been read by the scanner, to the personal computer 101 on the network. This transmitting function is a function for transmitting image data upon attaching it to e-mail, and for transmitting image data in accordance with an Internet facsimile protocol.

The personal computer 101 is capable of printing the application data 120 using the network printer function of the multifunction peripheral 105. The application that runs on the personal computer 101 calls the printer driver corresponding to the multifunction peripheral 105. The printer driver creates PDL data and transmits the PDL data to the multifunction peripheral 105. Upon receiving the PDL data, the multifunction peripheral 105 rasterizes the PDL data to create image data and prints the created image data using the printer.

Figure 2:
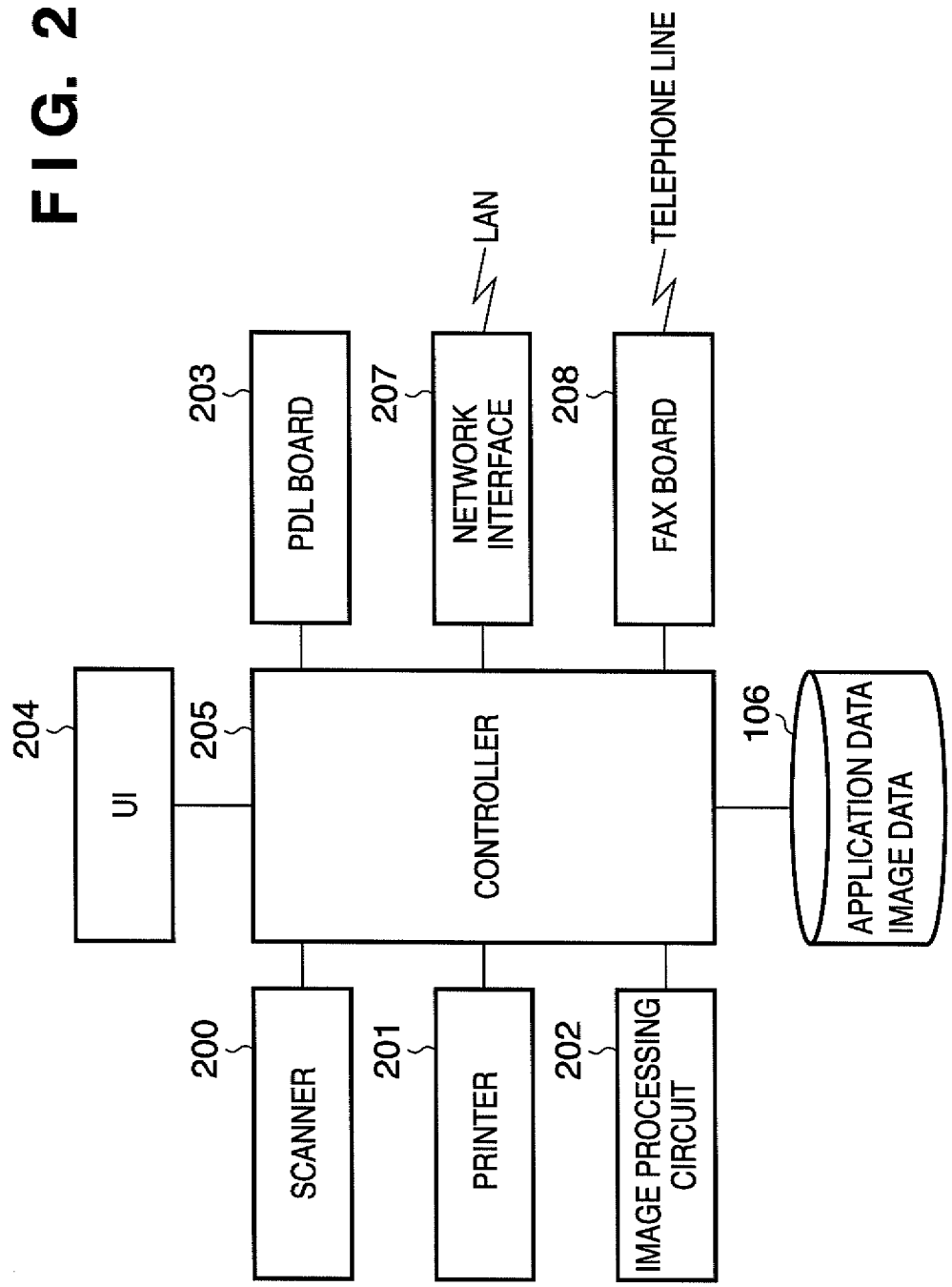
FIG. 2 is a block diagram illustrating an example of a multifunction peripheral.

FIG. 2 is a block diagram illustrating an example of the multifunction peripheral 105. A scanner 200 is one example of a reading unit for reading the image of a document. A printer 201 is one example of an image forming unit for forming an image on a print medium in accordance with entered image data. The print medium is also referred to as paper, a sheet, a transfer medium or transfer paper. It should be noted that the present invention is not dependent upon the image forming method used by the printer 201. The image forming method may be electrophotography, an ink-jet method, sublimation method or offset printing method, by way of example.

An image processing circuit 202 is a circuit for executing trimming processing, image scaling processing (image enlargement and reduction, etc.), image data compression processing (e.g., MH, MR, MMR, JBIG, JPEG, etc.) and processing for expanding image data from compressed data. A PDL board 203 is one type of image processing circuit for rasterizing PDL data, which has been received by a network interface (I/F) 207, to image data capable of being printed by the printer 201. It may be so arranged that processing described below for combining first and second images is executed by either the image processing circuit 202 or PDL board 203. A user interface (UI) 204 is a control panel comprising a liquid crystal display, touch-sensitive screen, etc. The user interface 204 is provided with hard keys such as a start key, stop key and numeric keys. A controller 205 is a control circuit for performing overall control of these components.

A network interface 207 is a communication circuit for making the connection to the LAN 100. The network interface 207 is capable of supporting various protocols. Examples are network-layer TCP/IP comprising IP, TCP, UDP; FTP, which is a file transfer service; and LDP (Line Printer Daemon), which is a server protocol for printing. Further examples are HTTP, which is a WWW server protocol, SMTP, which is an e-mail transfer protocol, and POP3, which is a mail downloading protocol. Also available is RPC (Remote Procedure Call) whereby a subroutine that exists in a remote system is called via a network. A FAX board 208 is a communication circuit for facsimile transmission and reception via a telephone line.

An operation executed when application data is printed from the personal computer 101 will be described. The controller 205 receives page data (e.g., PDL data), which is for printing the application data 120, from the personal computer 101 via the network interface 207. The PDL board 203 creates the image data 122 by rasterizing the PDL data. The controller 205 exercises control so as to print the image data 122 using the printer 201.

Figure 3:
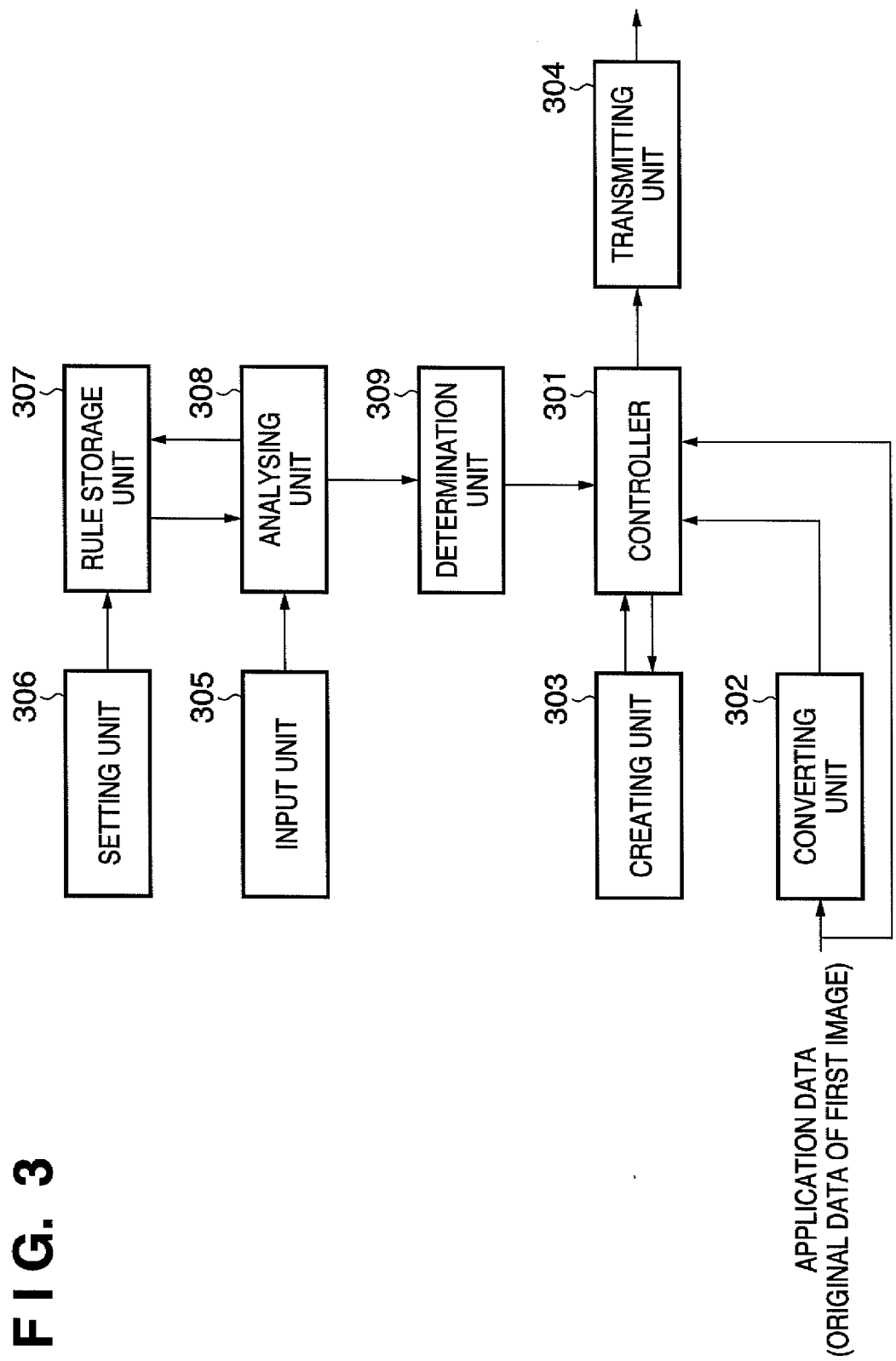
FIG. 3 is a functional block diagram of a personal computer.

FIG. 3 is a functional block diagram of the personal computer 101, which is one example of an information processing apparatus. Each component is a functional module implemented by using the CPU of the personal computer 101 to execute a computer program such as a printer driver. Some or all of the components may be implemented by hardware circuits. A controller 301 is a module for performing overall control of these components. A converting unit 302 is a module for converting the application data 120 to data (page data) on page-by-page basis. An example of page data is PDF data. By printing this page data, a first image, which is a main print target, is printed on the print medium. That is, the page data is one type of image data.

A creating unit 303 is a module for creating index data or a second image. The index data is identification information for associating the application data 120 and the image data 122 that has been generated from the application data 120. By conducting a search using this index data as a search key, it is possible to acquire the application data 120, which is the original data of the printed image. Specifically, the document management server in the multifunction peripheral 105 assumes that the application data 120, image data 122 and index data received from the personal computer 101 has been associated and stored in the document management database 124. It should be noted that the document management server 103 may possess this database.

An input unit 305 is a module for inputting an output setting (image forming mode) that is to be applied to the first image, which is the main print target. The first image contains image data represented by the application data 120. The information in the output setting (finishing setting) is transmitted to the controller 301. The output setting is setting information for specifying post-processing (stabling, punching and bookbinding, etc.) to be applied to the print medium on which the first image will be formed, and double-sided image formation. These items of setting information are input via the control panel of the multifunction peripheral 105 or a setting screen of the printer driver within the personal computer 101 in a manner similar to that of the prior art. A setting unit 306 is a module that sets a rule for deciding the position at which the second image is formed. A plurality of these rules can be set in accordance with the content of the output setting. A rule storage unit 307 is a module for storing rules that have been set.

An analyzing unit 308 is a module for analyzing the entered output setting. A determination unit 309 is a module which, on the basis of the rule stored in the rule storage unit 307 and the analyzed content of the output setting, decides the formation position of the second image so as not to impede the reading of the second image, which is utilized in order to acquire the original data of the first image printed on the print medium. For example, a position spaced away from a staple or punch hole is determined by the determination unit 309 as a position for forming the second image. It should be noted that the analyzing unit 308 may be part of the determination unit 309. The controller 301 controls the image forming apparatus so as to form the first and second images on the same or different sheets of the print medium in accordance with the formation position that has been determined, by way of example.

FIG. 4 is an example of a setting screen 400 for setting a rule. The setting screen 400 is displayed by the setting unit 306 on a monitor possessed by the personal computer 101. In this example, the position at which the second image is formed can be specified in accordance with the content of the presumed output setting.

When the first and second images are formed on the same page, a rule for deciding the position (e.g., lower right or upper right) of formation of the second image on the page can be set. Further, when a plurality of pages are printed, the rule may be made one that prints the second image, which corresponds to the first image formed on each page, on each page, or one that prints the second images collectively on another page. In a case where the second images are printed collectively on another page, the first page or the last page can be specified as the page for collective printing in the example of FIG. 4, by way of example.

Similarly, in a case where a binding setting has been made, whether the second image is to be printed on each page or collectively on the first page or last page can be specified as the rule. Further, if the binding setting has been made, the relationship between the formation position of the second image and the binding position can be specified. For example, a position spaced a specified distance away from the binding position of a print medium ascribable to stapling, punching or bookbinding can be specified as the formation position of the second image. Furthermore, it may be so arranged that this distance can be input as a specific numerical value.

In a case where a double-sided print setting in which images are formed on both sides of a print medium is made, the front side or back side can be specified as the page on which the second image is formed. In this case, the determination unit 309 decides the formation position of the second image taking the content of other output settings into consideration.

Depending upon the content of the output setting, rules can be applied upon being combined. As a result, in a case where, e.g., the plural-page setting and binding setting have been made, there can be an instance where the designation of the formation position of the second image corresponding to the plural-page setting and the designation of the formation position of the second image corresponding to the binding setting conflict with each other. Accordingly, an order of priority may be assigned to each output setting. The order of priority also is input through the setting screen 400. In a case where the plural-page setting and binding setting are combined, the analyzing unit 308 acquires the respective orders of priority from the rule storage unit 307. In this example, the order of priority of the binding setting is higher than that of the plural-page setting. As the rule to be applied, therefore, the determination unit 309 selects the rule that has been specified by the "IN CASE OF BINDING SETTING". As a result, the determination unit 309 decides upon the last page as the formation position of the second image.

The rule thus set through the setting screen 400 is stored in the rule storage unit 307. It should be noted that this rule can be set freely by the user using a pointing device or keyboard of the personal computer 101 or control panel of the multifunction peripheral 105. If a rule is thus set in advance, this is convenient because it will not be necessary for the user to specify the formation position of the second image whenever printing is performed.

Figure 5:
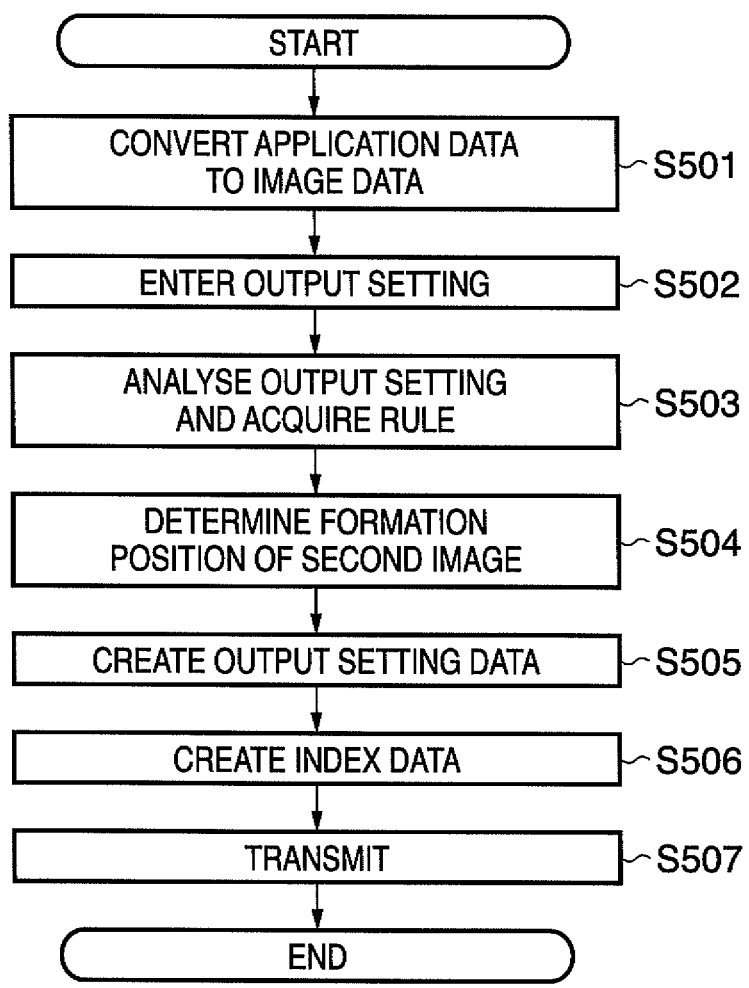
FIG. 5 is a flowchart illustrating an example of an information processing method.

FIG. 5 is a flowchart illustrating an example of an information processing method according to this embodiment. The processing relating to this flowchart is executed when a print command is input to an application for creating a handout document. That is, this information processing is executed by the printer driver.

At step S501, the converting unit 302 converts the application data 120, which has been delivered from the application, to image data. By way of example, the converting unit 302 creates PDF-file-format image data, which consists of data in page units, from the application data 120. Then, at step S502, the input unit 305 inputs an output setting to the analyzing unit 308. The information that is input relates to number of copies to be printed and finishing setting such as stapling, sorting, a binding setting and doubled-sided print setting.

At step S503, the analyzing unit 308 analyzes the entered output setting and acquires a rule prepared beforehand in conformity with the output setting. At step S504, the determination unit 309 determines the formation position of the second image based upon the rule acquired. In particular, in a case where a plurality of rules are combined in conformity with the content of the output setting, the determination unit 309 determines the formation position in accordance with the order of priority of the rules. The information relating to the formation position comprises information such as page number, position (upper right, lower left, etc.) on the page and distance from a binding position.

At step S505, the controller 301 creates output setting data that includes the entered output setting and the information concerning the formation position of the second image. At step S506, the creating unit 303 creates index data. As mentioned above, the index data is identification information for retrieving image data and application data stored in the database of the multifunction peripheral 105. It should be noted that the creating unit 303 may create the second image by subjecting the index data to two-dimensional encoding. The second image is a barcode image, by way of example. Barcode images include two-dimensional barcodes and one-dimensional barcodes. Two-dimensional barcodes include PDF417, DataMatrix, MaxiCode, Veri code and CODE49, by way of example. One-dimensional codes include QR code, JAN, standard ITF, CODE-128, CODE39 and NW-7, by way of example. Of course, the second image may be created using the manufacturer's own encoding technique. Thus, the second image is information that is the result of encoding information relating to the storage location of the first image.

At step S507, the controller 301 transmits the application data 120, image data 122, output setting data and index data (second image) to the multifunction peripheral 105 via a transmitting unit 304. This transmission is implemented by the RPC protocol, by way of example. It should be noted that these items of data need not be transmitted collectively at step S507 and may be transmitted at the time they are created.

Figure 6:
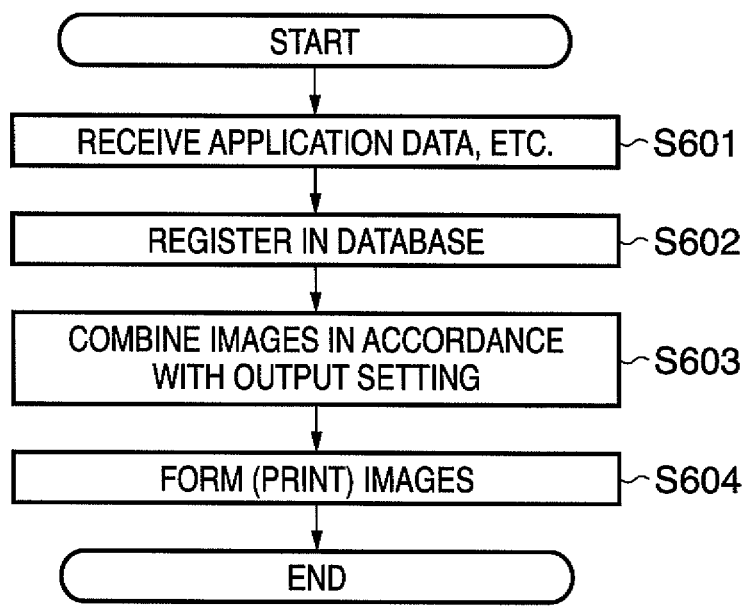
FIG. 6 is a method illustrating an example of an image forming method.

FIG. 6 is a diagram illustrating an example of an image creation method according to this embodiment. At step S601, the controller 205 of the multifunction peripheral 105 receives the application data 120, image data 122, output setting data and index data (second image) through the network interface 207. At step S602, the controller 205 registers the received application data 120, image data 122 and index data in the document management database 124.

At step S603, the controller 205 uses the image processing circuit 202 to combine the image data 122, which is for creating the first image, and the second image, thereby creating combined image data for printing. It should be noted that when index data and not a second image has been received from the personal computer 101, the controller 205 or image processing circuit 202 converts the index data to the second image. The image processing circuit 202 executes combining processing in accordance with the information concerning the formation position of the second image contained in the received output setting data. At step S604, the controller 205 sends the created image data to the printer 201 and forms the first and second images on the print medium.

It should be noted that QR data or the like, which involves a large quantity of storable data and also possesses an error-correcting function, is desirable as the second image. Further, although the original data of the second image is adopted as the index data in this embodiment, this does not impose a limitation upon the present invention. The reason for this is that any information may be used as long as it can be utilized to eventually acquire the original data (application data 120 or image data 122) of the first image. For example, the second image may be address data indicating the storage location of the original data of the first image. It should be noted that if the original data is text data and the amount of this data is an amount that can be expressed by the second image, then the second image may be the original data itself.

Furthermore, a second image may be created for every text portion and every object such as an image portion contained in the first image. Further, a single second image may be created for every job. One job usually includes a plurality of pages. In such case the original data of these pages would be capable of extraction by a single second image.

Figure 7:
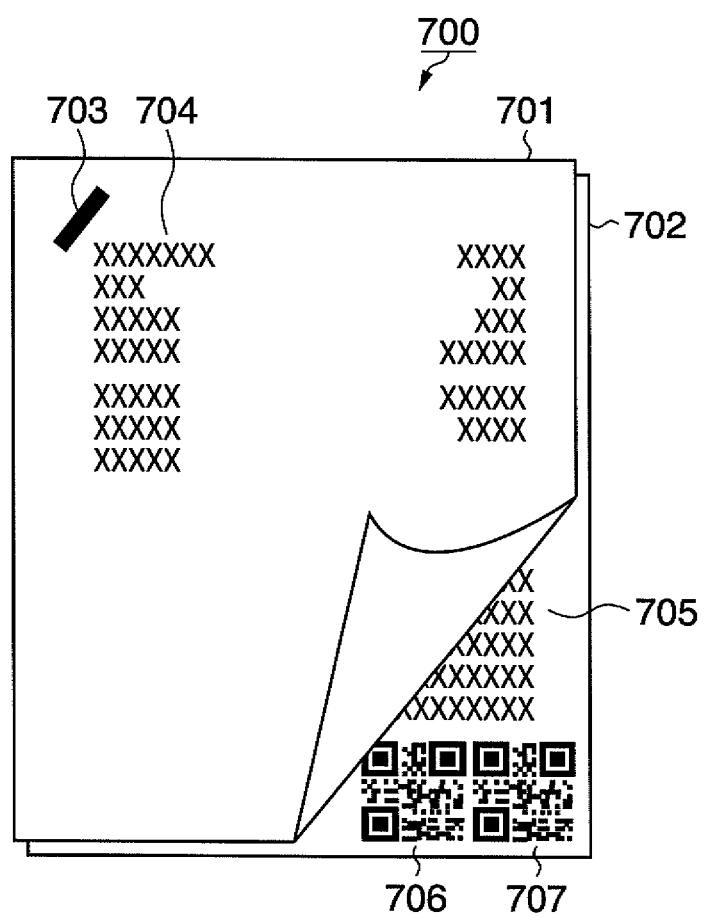
FIG. 7 is a diagram illustrating an example of a handout document that has been created.

FIG. 7 is a diagram illustrating one example of a handout document 700 that has been created. The handout document 700 consists of two sheets of paper (namely a first page 701 and a second page 702). The upper-left corner of the handout document 700 has been bound by a staple 703. A first image 704 has been printed on the first page 701, and another first image 705 has been printed on the second page 702. In particular, two second images 706 and 707 have been printed at the lower right of the second page 702. The second images 706 and 707 correspond to the first image 704 on the first page and the first image 705 on the second page, respectively. If a second image overlaps the staple 703, for example, it will not be possible to read the second image accurately. Further, in a case where a second image is formed on a page other than the first page, if the second image is created near the staple 703, it will be difficult to read the second image when the handout document 700 has been bound together. With the positions shown in FIG. 7, however, the reading of the second images 706 and 707 will not be impeded.

When the second images 706 and 707 are read by the scanner 200, the controller 205 decodes the index data from the second images. The controller 205 further searches the document management database using the decoded index data as a search key and extracts the original data. The original data is the application data 120 or image data 122. Thus, the controller 205 is one example of an acquisition unit that acquires the original data of the first image in accordance with the second image that has been read.

In accordance with this embodiment, it is so arranged that the reading of a second image utilized in order to acquire the original data of a first image, which is the main print target, will not be impeded. As a result, the probability that the original data of the first image can be acquired is raised over that of the prior art. Since the rule for determining the position at which the second image is formed can be set by the user in advance, an advantage gained is that the formation position can be customized in conformity with the preference of each user. There may also be cases where printing is instructed upon combining settings such as stapling, punching, bookbinding or double-sided image formation. In such cases the formation position of the second image can be determined smoothly in accordance with the order of priority of a plurality of rules corresponding to the output setting.

Stapling, punching, bookbinding and double-sided image formation can be mentioned as examples of output settings. The reason for this is that these are typical output settings that impede the reading of a second image. The second image may be index data for specifying the original data of the first image, address data indicating the storage location of the original data or the original data itself, by way of example. In other words, as long as the original data of the first image can be acquired smoothly, the second image may be any kind of image. Furthermore, the second image may be a two-dimensional code generated by converting information that is for acquiring the original data of the first image. In particular, since a two-dimensional code such as QR code has an error-correcting function, there is a higher probability that the original data can be acquired even if the handout document becomes somewhat soiled.

Further, the creating unit 303 may create index data in units of jobs, pages or objects that are for forming the first image. Furthermore, the creating unit 303 may create the image data of the second image from the index data. For example, if the second image is created on a per-job basis, then, by reading a single second image, the original data involved in the job can be acquired in one batch. Further, if the second image is created on a per-object basis, this is convenient since superfluous information will no longer be extracted when it is desired to acquire only part (a text area) of a page.

Second Embodiment

Illustrated next will be an example in which a second image is read from a handout document, the original data of a first image is acquired based on the read second image and the acquired original data is utilized.

Figure 8:
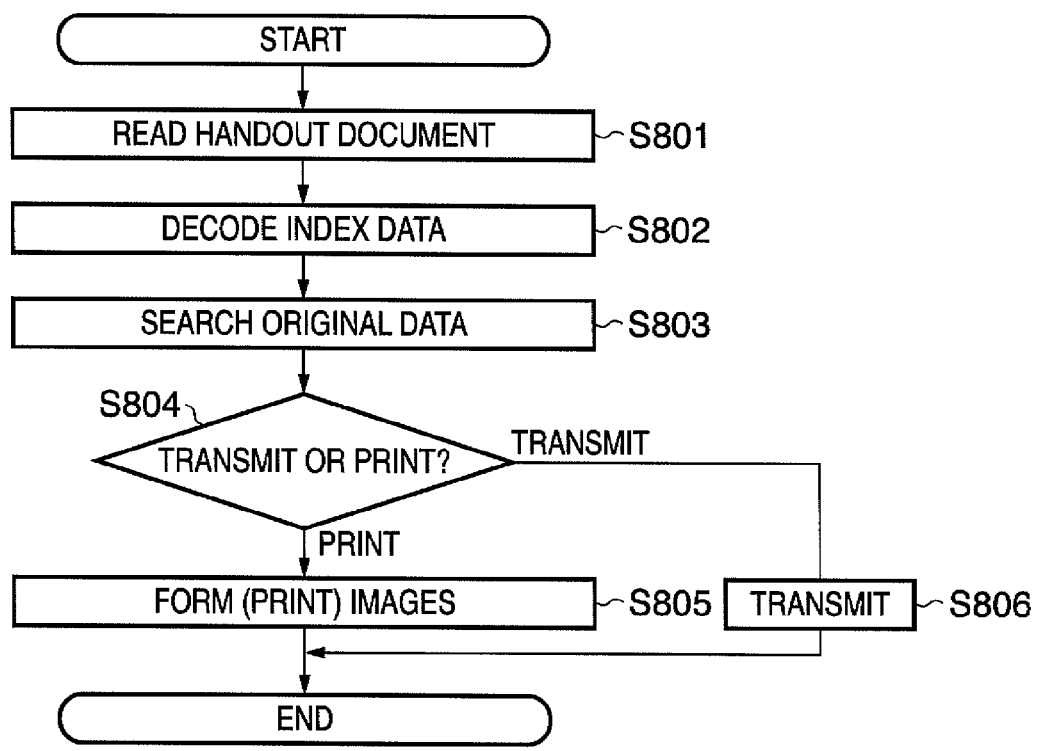
FIG. 8 is a flowchart illustrating an example of a method utilizing original data.

FIG. 8 is a flowchart illustrating an example of a method of utilizing original data according to this embodiment. In the method described, original data will be printed and transmitted. At step S801, the controller 205 of the multifunction peripheral 105 uses the scanner 200 to read a handout document that has been circulated at a conference of the like. The handout document need not be the first-generation handout document printed at step S604. The handout document may be a second-generation handout document obtained by copying a first-generation document, or a later-generation handout document whose image quality has deteriorated. Further, the handout document may be one bearing a handwritten note or one provided with a hole in order that the document may be found in a binder or the like. Further, although the first-generation handout document is a color handout document, it may be a monochrome handout document that is the result of copying a second-generation handout document by a monochrome copier. In other words, it will suffice if the second image has been formed on a handout document in an analyzable state.

At step S802, the controller 205 controls the image processing circuit 202, extracts a second image such as QR code from the read image and decodes index data from the extracted second image. It is assumed that the image processing circuit 202 functions for encoding and decoding index data. At step S803, the controller 205 searches the document management database 124 using the index data as a search key in order to acquire the original data.

At step S804, the controller 205 determines whether the method of utilization specified from the user interface 204 is print processing or transmit processing. If print processing has been specified, control proceeds to step S805. Here the controller 205 executes image formation processing by the printer 201 using the original data acquired. It should be noted that the original data preferably is image data, although it may just as well be application data. If the original data is application data, it is necessary that this original data be converted to image data.

If transmit processing has been specified, on the other hand, control proceeds to step S806. Here the controller 205 transmits the acquired original data to a destination specified via the user interface 204. The original data in this case also be may application data or image data. Transmission of the original data may be executed by e-mail or FPT, etc. That is, the present invention is not particularly dependent on any protocol.

In accordance with this embodiment, since a document is created again based upon original data, it is possible to create a document having a quality higher than that of a second-generation copy that has been copied from a handout document.

Further, if the original data is transmitted, the usability of the data is raised over that of simple image data acquired from the handout document. In particular, the reutilization of application data is facilitated. Further, since application data generally has a data size smaller than that of image data, this is advantageous from the viewpoint of reducing network traffic.

Third Embodiment

In accordance with the first embodiment, a method of forming a second image at a formation position specified by a printer driver has been proposed. If a rule that has been created by a user has a problem, however, a situation in which the second image is formed overlapping an important part of the first image can arise. Further, if the specified distance from a binding position is insufficient, such an undesirable event will occur. Accordingly, in this embodiment, an aspect of the invention in which the formation position of a second image is changed upon detecting the content of image data for forming a first image will be described.

Figure 9:
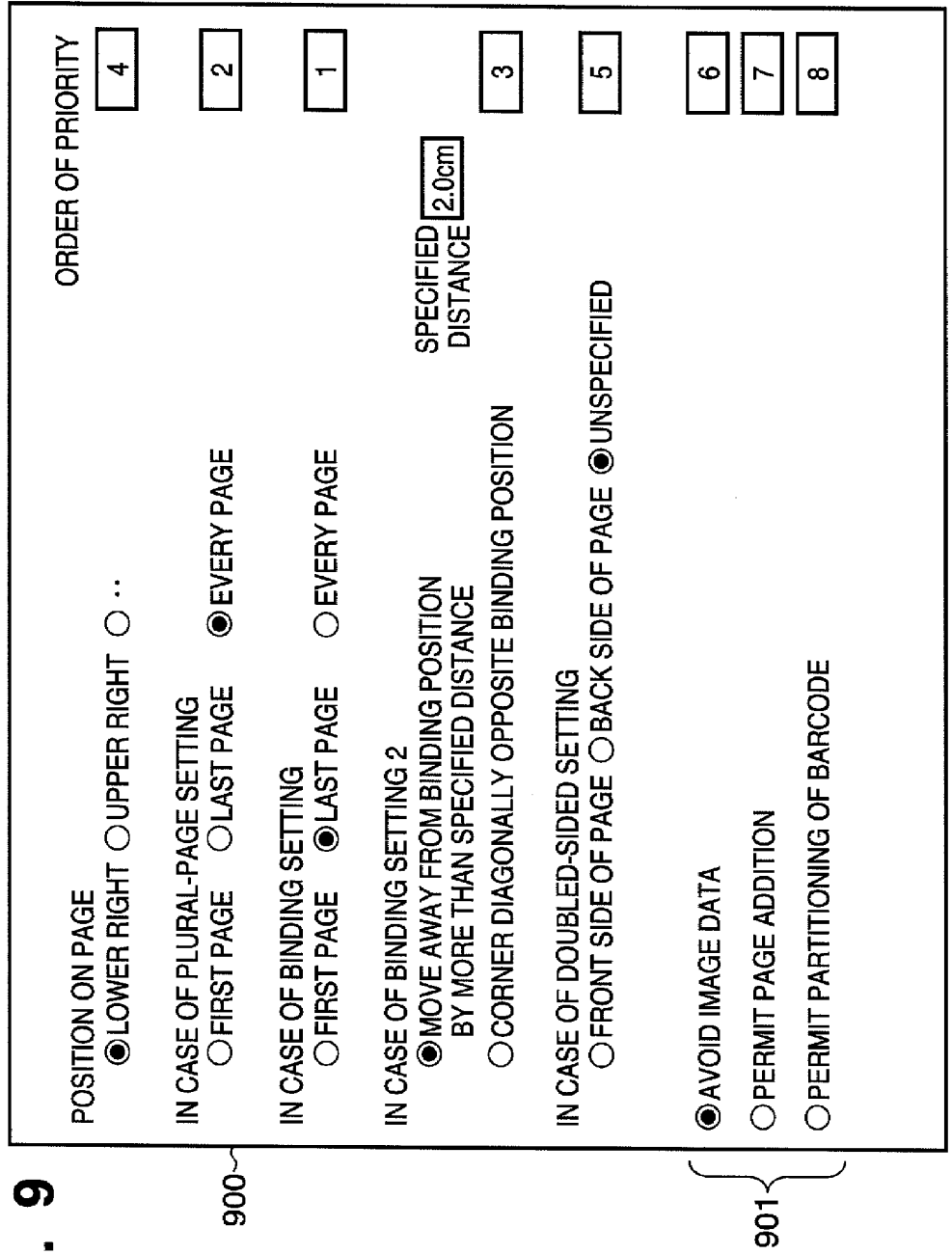
FIG. 9 is a diagram illustrating an example of a setting screen.

FIG. 9 is a diagram illustrating an example of a setting screen 900 according to a third embodiment. If the setting screen 900 is compared with the setting screen 400 described earlier, it will be seen that the setting screen 900 is additionally provided with items 901 for setting information referred to when an image formation position is changed. Here the user can designate the formation of a second image while avoiding a first image (the second image is formed on any position so as not to overlap the first image); the addition of a page and formation of a second image on this page; or permission to plurality of second image.

Figure 10:
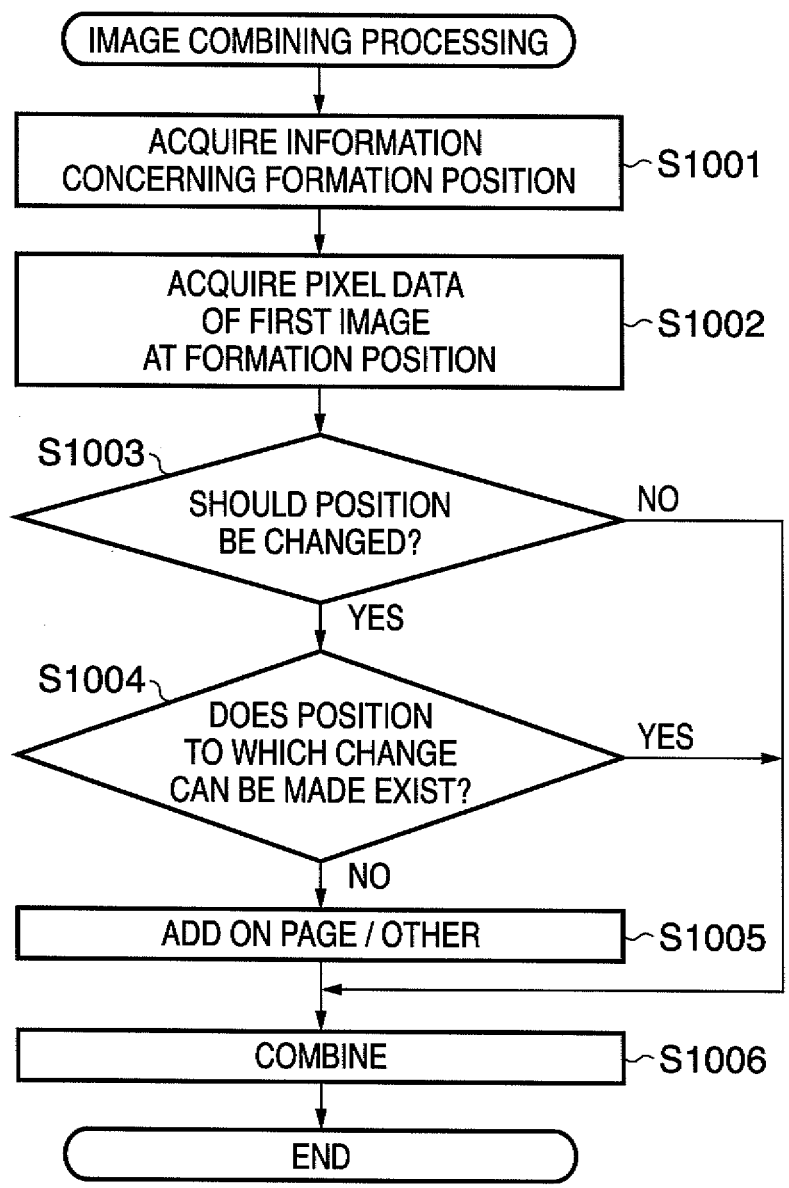
FIG. 10 is a flowchart illustrating an example of image combining processing.

FIG. 10 is a flowchart illustrating an example of image combining processing according to this embodiment. This combining processing corresponds to step S603 described above. At step S1001, the controller 205 acquires information concerning the formation position of the second image from output setting data that has been received. The information concerning the formation position of the second image includes coordinate data for specifying a formation position on the print medium. It goes without saying that the size of the second image can be calculated from the coordinate data. At step S1002, the controller 205 acquires pixel data of the first image corresponding to the formation position of the second image.

At step S1003, the controller 2005 determines whether the formation position of the second image is to be changed based upon the pixel data acquired. For example, if the acquired pixel data is 0 or data indicating a background color, then it is generally unnecessary to change the formation position. However, if the pixel data is other than the above, then it is presumed that the pixel data is the pixel data of a comparatively important object in the first image. In this case, therefore, the formation position of the second image should be changed. If there is little need to change position, control proceeds to step S1006. Here the controller 205 executes combining in the ordinary manner using the image processing circuit 202.

If the position should be changed, on the other hand, then control proceeds to step S1004, where the controller 2005 determines whether the position at which the second image can be formed (the position to which the change can be made) exists on the page. This determination involves determining whether the first image has a blank area or background area that is larger than the size of the second image. If a position to which the change can be made exists, then the controller 2005 changes the formation position of the second image to this position. Then, at step S1006, the controller 205 controls the PDL board 203 in such a manner that the second image is formed at the changed formation position.

If a position at which formation is possible does not exist, on the other hand, then, at step S1005, the controller 205 reads out the setting information contained in the output setting data, adds on a page anew and sends the image processing circuit 202 a command to form the second image on this page. It should be noted that if addition of a page has not been permitted on the setting screen 900 shown in FIG. 9, the controller 205 may determine which takes precedence, the first image or a combining-prohibited area (a binding position, etc.). The determination as to which takes precedence is made in accordance with the order of priority that has been set on the setting screen 900. At step S1006, the controller 205 instructs the image processing circuit 202 to change the formation position of the second image to the page, etc., that has been added on. The image processing circuit 202 combines the second image with the first image in accordance with the command and forms image data for printing.

It should be noted that in a case where a position to which a change can be made does not exist because the size of the second image is greater than a prescribed size, the controller 205 may form the index data as a plurality of second images that are smaller than the prescribed size. Alternatively, the controller 205 may convert the second image to a plurality of second images that are smaller than the prescribed size and print the converted second images. In this case, the controller 205 decodes index data from the plurality of second images read by the scanner 200.

FIG. 11 is a diagram illustrating an example of a handout document that has been created. In this example, an object 1102 exists at the lower right of the last page. Accordingly, a second image 1101 has been formed at a position that avoids the position of the object 1102. In accordance with this embodiment, even if a predetermined formation position of a second image is inappropriate, the formation position can be changed to a more suitable position. This will improve the probability that the original data of the first image can be acquired.

In this embodiment, a change in the formation position of the second image is executed by the multifunction peripheral 105. However, this may of course be implemented by the printer driver of the personal computer 101. In this case, steps S1001 to S1005 are executed at step S504. That is, the determination unit 309 determines whether the formation position of the second image should be changed based upon pixel data of the first image corresponding to the formation position of the second image that has been determined. If the formation position should be changed, the determination unit 309 specifies a position at which the second image is capable of being formed. Further, if a position at which the second image can be formed does not exist, the determination unit 309 may add on a page and change the formation position of the second image to a position at which the second image can be formed on the added page. Furthermore, if a position at which the second image can be formed does not exist, the controller 301 may exercise control so as to convert the index data to a plurality of second images and form a plurality of converted second on the print medium.

Fourth Embodiment

In accordance with the foregoing embodiments, the first and second images are not necessarily printed on the same page. In a case where a plurality of second images have been formed collectively on a single page, there is the danger than if the number of pages increases, it will no longer be possible to readily specify which first images and which second images are in correspondence. Accordingly, in this embodiment, it is so arranged that the corresponding relationship between first and second images can be grasped visually. In particular, when images are combined by the image processing circuit 202, the controller 205 exercises control so as to append recognition information corresponding to respective ones of the first and second images. This processing may of course be executed by the personal computer 101. In this case, the controller 301 controls the multifunction peripheral 105 in such a manner that recognition information that makes it possible to visually grasp the corresponding relationship between the first and second images is printed by being applied to respective ones of the first and second images.

Figure 12:
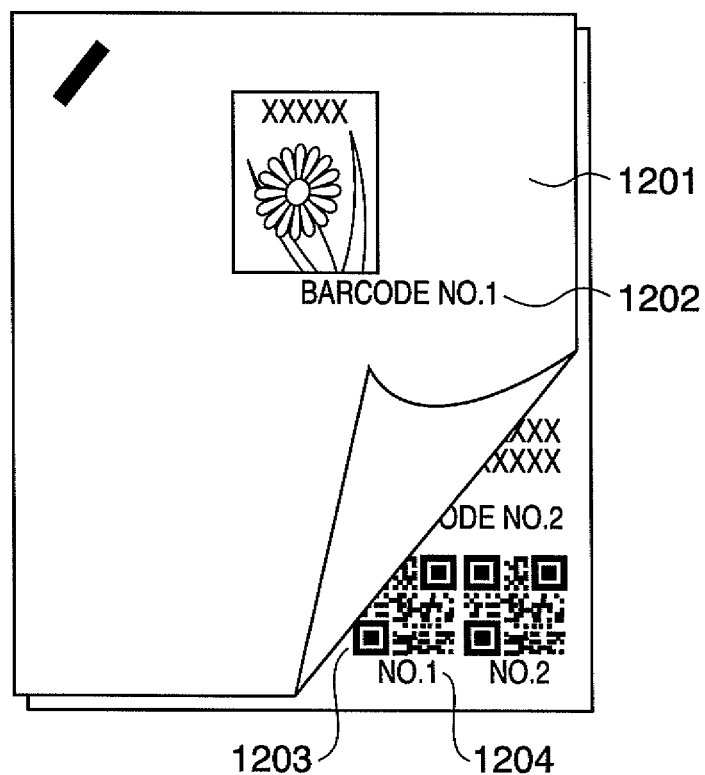
FIG. 12 is a diagram illustrating an example of a handout document that has been created.

FIG. 12 is a diagram illustrating an example of a handout document that has been created. In this example, "Barcode No." is employed as the recognition information. As illustrated in FIG. 12, recognition information 1202 has been appended to a first image 1201 printed on a first page. A second image 1203 corresponding to the first image has been printed on a second page. Furthermore, identification information 1204 has been printed below the second image 1203. It goes without saying that the recognition information 1202 need match the image information 1204 perfectly, and it will suffice if the recognition information 1202 has enough commonality with the image information 1204 to allow the correspondence between the two to be comprehended.

Other Embodiments

Embodiments of the present invention have been described above in detail. It is possible for the present invention to be worked as, e.g., a system, apparatus, method, program or storage medium, etc. Further, although the multifunction peripheral 105 serves as the example in the foregoing embodiments, it goes without saying that the present invention can also be implemented by a scanner apparatus and network printer.

Further, the main portions of the above-described information processing may be implemented by the multifunction peripheral 105. For example, the user interface 204 implements the input unit 305. Further, the controller 205 implements the creating unit 303, setting unit 306, analyzing unit 308 AND determination unit 309. As a result, it is possible for an image that has been read by the scanner 200 of the multifunction peripheral 105 to be adopted as the first image.

Further, the information processing of the present invention may be implemented not as a printer driver but as another computer program. The present invention may also be attained by supplying a software program, which implements the functions of the foregoing embodiments, directly or remotely to a system or apparatus, reading the supplied program code with a computer of the system or apparatus, and then executing the program.

Accordingly, since the functions and processing of the present invention are implemented by computer, the program codes per se installed in the computer also implement the present invention. In other words, the computer program per se for implementing the foregoing functions and processing also is one aspect of the present invention.

In this case, so long as the system or apparatus has the functions of the program, the form of the program, e.g., object code, a program executed by an interpreter or script data supplied to an operating system, etc., does not matter.

Examples of recording media for supplying a program are a flexible disk, hard disk, optical disk, magneto-optical disk, CD-ROM, CD-R and CD-RW. Further examples of recording media are magnetic tape, a non-volatile type memory card, ROM, DVD (DVD-ROM, DVD-R), etc.

Further, the program may be downloaded from a website on the Internet using a browser possessed by a client computer. That is, the computer program per se of the present invention or a compressed file that has an automatic installation function may be downloaded to a recording medium such as a hard disk from the website. Further, implementation is possible by dividing the program code constituting the program of the present invention into a plurality of files and downloading the files from different websites. In other words, there are cases where a WWW server that downloads, to multiple users, the program files that implement the functions and processes of the present invention by computer also is a structural requisite of the present invention.

Further, the program of the present invention may be encrypted, stored on a storage medium such as a CD-ROM and distributed to users. In this case, only users who meet certain requirements are allowed to download decryption key information from a website via the Internet, the encrypted program may be decrypted using the key information and then executed, and the program may be installed on a computer.

Further, the functions of the embodiments may be implemented by having a computer execute a program that has been read. In addition, an operating system or the like running on the computer may perform all or a part of the actual processing based upon the indications in the program. Of course, the functions of the embodiments can be implemented in this case as well.

Furthermore, it may be so arranged that a program that has been read from a recording medium is written to a memory provided on a function expansion board inserted into the computer or provided in a function expansion unit connected to the computer. A CPU or the like provided on the function expansion board or function expansion unit may perform some or all of the actual processing based upon the indications in the program. There are instances where the functions of the foregoing embodiments are implemented in this manner as well.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-337577, filed on Dec. 14, 2006, which is hereby incorporated by reference herein in its entirety.

What is claimed is:

1. An information processing apparatus for outputting image data of a second image in such a manner that the second image is printed on a print medium by an image forming apparatus upon appending the second image to supplement a first image that is a print target, the second image being information related to the first image, said information processing apparatus comprising:
an input unit configured to input an image forming mode for the first image as an output setting;
a rule setting unit configured to manually set a rule for determining a formation position of the second image corresponding to content of the output setting, the rule including a first item and a second item, the first item and the second item each respectively having an option selected from a plurality of options;
a priority setting unit configured to set a high priority to one of the first item and the second item to determine the formation position of the second image;
a determination unit configured to determine the formation position of the second image on the print medium on which the first image is also printed based upon the content of the output setting that has been input by said input unit and the rule that has been set by said rule setting unit and the priority that has been set been by the priority setting unit; and
a control unit configured to control the image forming apparatus in accordance with the determined formation position in such a manner that the first and second images are formed on the same or different sheets of a print medium,
wherein said determination unit is further configured to determine the formation position of the second image based on an item which is set at a high priority between the first item and the second item by said priority setting unit, in a case where both the first item and the second item are included in the rule based on the output setting, and an option selected in the first item conflicts with an option selected in the second item.

2. The apparatus according to claim 1, wherein said rule setting unit sets as a rule whether or not the second image is formed at a position where the second image does not overlap the first image.

3. The apparatus according to claim 1, wherein, if said rule setting unit has set the rule that the second image is formed at the position where the second image does not overlap the first image, said determination unit determines whether the formation position is to be changed based upon pixel data of the first image corresponding to the determined formation position of the second image; and if the formation position is to be changed, said determination unit specifies an image-formable position, which is a position at which the second image is capable of being formed.

4. The apparatus according to claim 3, wherein if an image-formable position of the second image does not exist on the page on which the first image has been formed, said rule setting unit sets as a rule whether a page on which the second image is formed is added or not, if the rule has been set such that the page on which the second image is formed is added, said determination unit determines a position on the added page as the formation position of the second image.

5. The apparatus according to claim 3, wherein if an image-formable position of the second image does not exist on the page on which the first image has been formed, said rule setting unit sets as a rule whether or not the second image is converted into a plurality of second images whose size is smaller than a predetermined size, and
if the rule has been set such that the second image is converted into the plurality of second images whose size is smaller than the predetermined size, said control unit exercises control so as to convert the second image to a plurality of second images each having a size smaller than a predetermined size, and forms the plurality of second images on the print medium.

6. The apparatus according to claim 1, wherein the output setting is a setting for post-processing to be applied to the print medium on which the first image is formed.

7. The apparatus according to claim 6, wherein the post-processing comprises at least one of stapling, punching and bookbinding.

8. The apparatus according to claim 1, wherein the output setting is a setting for double-sided image formation.

9. The apparatus according to claim 6, wherein said determination unit determines a position, which is more than a specified distance away from a binding position of the print medium, as the formation position of the second image.

10. The apparatus according to claim 1, wherein the second image is index data for specifying original data of the first image or address data indicating a storage location of the original data.

11. The apparatus according to claim 1, wherein the second image is a barcode image generated by converting information for acquiring original data of the first image.

12. The apparatus according to claim 1, further comprising a creating unit which creates image data of the second image in units of a job for forming the first image, a page included in the first image or text and image included in the first image.

13. The apparatus according to claim 1, wherein said control unit exercises control so as to append recognition information to respective ones of the first and second images, the recognition information making it possible to visually grasp a corresponding relationship between the first and second images.

14. An information processing apparatus for printing a second image on a print medium upon appending the second image to supplement a first image that is a print target, the second image being information related to the first image, said information processing apparatus comprising:
an input unit configured to input an image forming mode for the first image as an output setting;
a rule setting unit configured to manually set a plurality of rules for determining a formation position of the second image corresponding to content of the output setting, the rules including a first item and a second item, the first item and the second item respectively each having an option selected from a plurality of options;

a priority setting unit configured to set a high priority to one of the first item and the second item to determine the formation position of the second image;

a determination unit configured to determine the formation position of the second image on the print medium on which the first image is also printed based upon the content of the output setting that has been input by said input unit and the rules and the priority that have been set by said rule setting unit and the priority that has been set by the priority setting unit; and an image forming unit configured to form the first and second images on the same or different sheets of a print medium in accordance with the determined formation position, wherein said determination unit is further configured to determine the formation position of the second image based on an item which is set at a high priority between the first item and the second item by said priority setting unit, in a case where both the first item and the second item are included in the rule based on the output setting, and an option selected in the first item conflicts with an option selected in the second item.

15. The apparatus according to claim 14, further comprising:

a reading unit configured to read the second image formed on the print medium; and an acquisition unit configured to acquire original data of the first image in accordance with the read second image.

16. A method of controlling an information processing apparatus for outputting image data of a second image in such a manner that the second image is printed on a print medium by an image forming apparatus upon appending the second image to supplement a first image that is a print target, the second image being information related to the first image, said method comprising:

an input step of inputting an image forming mode for the first image as an output setting;

a rule setting step of manually setting a rule plurality a rule for determining a formation position of the second image corresponding to content of the output setting, the rule including a first item and a second item, the first item and the second item respectively having an option selected from a plurality of options;

a priority setting step for setting a high priority to one of the first item and the second item to determine the formation position of the second image;

a determination step for determining the formation position of the second image on the print medium on which the first image is also printed based upon content of the output setting that has been input at said input step and the rule that has been set in said rule setting step and the priority that has been set by the priority setting step; and a control step of controlling the image forming apparatus so as to form the first and second images on the same or different sheets of a print medium in accordance with the determined formation position, wherein said determination step further comprises determining the formation position of the second image based on an item which is set at a high priority between the first item and the second item in said priority setting step, in a case where both the first item and the second item are included in the rule based on the output setting, and an option selected in the first item conflicts with an option selected in the second item.

17. A non-transitory computer-readable storage medium storing a computer program for controlling an information processing apparatus for outputting image data of a second image in such a manner that the second image is printed on a print medium by an image forming apparatus upon appending the second image to supplement a first image that is a print target, the second image being information related to the first image, said program, when executed by a computer, causing the information processing apparatus to implement the following steps:

an input step of inputting an image forming mode for the first image as an output setting;

a rule setting step of manually setting a rule for determining a formation position of the second image corresponding to content of the output setting, the rule including a first item and a second item, and the first item and the second item respectively having an option selected from a plurality of options;

a priority setting step for setting a high priority to one of the first item and the second item to determine the formation position of the second image;

a determination step of determining the formation position of the second image on the print medium on which the first image is also printed based upon content of the output setting that has been input by said input unit and the plurality of rules and the priority that have been set in said rule setting step and the priority that has been set by the priority setting step; and a control step of controlling the image forming apparatus so as to form the first and second images on the same or different sheets of a print medium in accordance with the determined formation position, wherein said determination step further comprises determining the formation position of the second image based on an item which is set at a high priority between the first item and the second item in said priority setting step, in a case where both the first item and the second item are included in the rule based on the output setting, and an option selected in the first item conflicts with an option selected in the second item.

* * * * *